United States Patent [19]
Crane, Jr. et al.

[11] Patent Number: 5,941,617
[45] Date of Patent: Aug. 24, 1999

[54] DECORATIVE PANEL FOR COMPUTER ENCLOSURE

[75] Inventors: Stanford W. Crane, Jr., Boca Raton; Daniel J. Michalski, West Palm Beach; Moises Behar, Boca Raton, all of Fla.

[73] Assignee: The Panda Project, Boca Raton, Fla.

[21] Appl. No.: 08/970,434

[22] Filed: Nov. 14, 1997

[51] Int. Cl.⁶ ................................................. A47B 97/00
[52] U.S. Cl. .................. 312/204; 312/223.2; 312/213
[58] Field of Search .......... 174/35 R; 361/816, 361/818, 683; 52/3, 316, 311.1; 312/204, 223.2, 265.5, 265.6, 257.1, 7.2, 223.1, 213

[56] References Cited

U.S. PATENT DOCUMENTS

| | | | |
|---|---|---|---|
| 288,473 | 11/1883 | Newcomb | 52/316 X |
| 3,164,428 | 1/1965 | Kesh | 312/213 |
| 3,343,896 | 9/1967 | Mangels et al. | 312/7.2 |
| 3,588,212 | 6/1971 | Gersch | 312/204 X |
| 4,785,136 | 11/1988 | Mollet et al. | 174/35 R |
| 4,949,934 | 8/1990 | Krenz et al. | 312/213 X |
| 5,136,119 | 8/1992 | Leyland | 175/35 R |
| 5,164,542 | 11/1992 | Hart | 361/683 X |
| 5,176,435 | 1/1993 | Pipkens | 312/204 |
| 5,239,125 | 8/1993 | Savage et al. | 361/816 X |
| 5,547,272 | 8/1996 | Paterson et al. | 312/204 X |
| 5,593,219 | 1/1997 | Ho | 312/265.5 X |

*Primary Examiner*—Peter M. Cuomo
*Assistant Examiner*—Janet M. Wilkens
*Attorney, Agent, or Firm*—Morgan, Lewis & Bockius LLP

[57] ABSTRACT

Disclosed is a decorative panel for attachment to the exterior of a computer enclosure including a fastener receiving portion for facilitating attachment of the decorative panel to an outer surface of the computer enclosure, a plurality of irregular geometric shaped surface depressions on a first surface of the decorative panel fixed in an ornamental arrangement, and at least one bore which extends completely through the decorative panel adapted to allow air to flow through the decorative panel and into an interior of the computer enclosure.

21 Claims, 19 Drawing Sheets

DECORATIVE PANEL FOR COMPUTER ENCLOSURE

RELATED APPLICATIONS

This application is related to several other patent applications which are commonly owned by the Assignee of this application. Those related applications are: U.S. Design Patent Application, Ser. No. 29/081,929 entitled Computer Cabinet, U.S. patent application, Ser. No. 08/970,503 entitled Cooling System for Semiconductor Die Carrier, U.S. patent application, Ser. No. 08/970,379 entitled Multi-Chip Module, and U.S. patent application, Ser. No. 08/970,502 entitled Interface Optimized Computer System Architecture, all of which are hereby incorporated by reference.

BACKGROUND OF THE INVENTION

1. Field of Invention

The present invention relates to a decorative panel for attachment to the outer surface of a computer enclosure.

2. Description of Related Art

Conventional computer enclosures suffer from several disadvantages. Conventional computer enclosures (cabinets) are not aesthetically appealing. The plain, box-like structures did nothing to enhance the aesthetics of the workplace. Furthermore, conventional computer enclosures do not facilitate the necessary airflow to cool the internal components of the computer. Also, conventional computer enclosures, which stand on a face of the box-like structure, require too large a portion of the available work space. Finally, conventional computer enclosures require substantial metallic structure to prevent electromagnetic interference and/or radio frequency interference from passing through the outer surfaces of the enclosure.

Accordingly, there is a need for a decorative panel for the exterior of a computer enclosure which is aesthetically appealing, facilitates the necessary airflow to cool the internal components of the computer, allows for space saving placement of the housing, and effectively and conveniently prevents electromagnetic and radio frequency interference from passing through the outer surfaces of the enclosure.

SUMMARY OF THE INVENTION

Accordingly, the present invention is directed to a decorative panel for the exterior of a computer enclosure which substantially eliminates one or more of the problems or disadvantages found in the prior art.

An object of the present invention is to provide for a decorative panel which is easy to attach to the exterior of a computer enclosure.

Another objective of the present invention is to provide a decorative panel for the exterior of a computer enclosure which contains openings to facilitate the necessary airflow to cool the computer's internal components.

Another objective of the present invention is to allow for space saving placement of the enclosure.

Another object of the present invention is to effectively prevent electromagnetic and radio frequency interference from passing through the outer surfaces of the enclosure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the invention, as embodied and broadly described, the invention contemplates a decorative panel for attachment to the exterior, or interior, of a computer enclosure including a fastener receiving portion for facilitating attachment of the decorative panel to an outer surface of the computer enclosure, a plurality of irregular geometric shaped surface depressions on a first surface of the decorative panel fixed in an ornamental arrangement, and at least one bore which extends completely through the decorative panel adapted to allow air to flow through the decorative panel and into an interior of the computer enclosure.

In another aspect, the invention contemplates a computer housing including an enclosure adapted to receive the internal components of a computer, six rectangular decorative panels attached to outer surfaces of the enclosure, at least one of the decorative panels including a fastener receiving portion for facilitating attachment of the decorative panel to one of the outer surfaces of the computer enclosure, a plurality of irregular geometric shaped surface depressions on a first surface of the decorative panel fixed in an ornamental arrangement, and at least one bore which extends completely through the decorative panel adapted to allow air to flow through the decorative panel and into an interior of the enclosure.

It is to be understood that both the general description above, and the following detailed description are exemplary and explanatory and are intended to provide further explanation of the invention as claimed.

BRIEF DESCRIPTION OF THE DRAWINGS

The accompanying drawings which are included to provide a further understanding of the invention and constitute a part of this specification, illustrate embodiments of the invention and together with the written description, serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In accordance with the objects of the present invention, the cubic computer housing includes an enclosure adapted to receive the internal components of a computer, six rectangular, more specifically square decorative panels attached to outer surfaces of the enclosure, at least one of the decorative panels including a fastener receiving portion for facilitating attachment of the decorative panel to one of the outer surfaces of the computer enclosure, a plurality of irregular geometric shaped surface depressions on a first surface of the decorative panel fixed in an ornamental arrangement, and at least one bore which extends completely through the decorative panel adapted to allow air to flow through the decorative panel and into an interior of the enclosure. The airflow improves cooling of the various component disposed in the enclosure. For example, FIG. 1 a perspective view of a computer housing according to a preferred embodiment of the present invention showing decorative panels B, C, and F.

Computer housing 10 includes a enclosure or skeleton (not pictured) in which internal computer components are received. According to a preferred embodiment of the present invention, the enclosure or skeleton has decorative panels A, B, C, D, E, and F mounted to its exterior surfaces. The enclosure or skeleton may be constructed of any appropriate rigid material. For example, the enclosure or skeleton may be constructed of metal or a high-strength plastic. Preferably, the enclosure or skeleton may be constructed of an injection molded plastic or aluminum.

Figure 1:
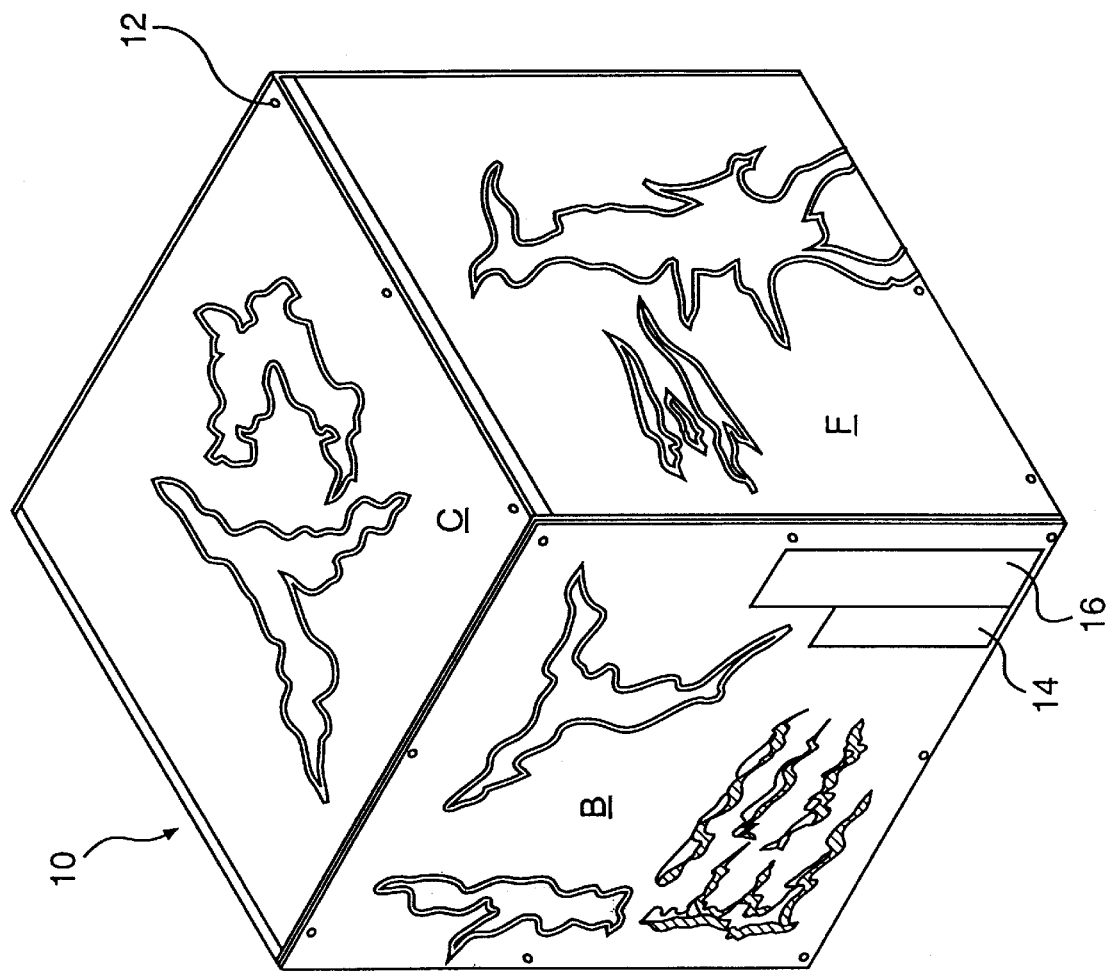
FIG. 1 is a perspective view of a computer housing according to a preferred embodiment of the present invention showing decorative panels B, C, and F.

As shown in FIG. 1, decorative panels B, C, and F are attached to the enclosure or skeleton by fasteners 12. Fasteners 12 may comprise any appropriate fastening means. For example, fasteners 12 may comprise bolts, screws, or rivets. Preferably, fasteners 12 comprise screws with countersunk heads. As is also shown in FIG. 1, face plates of disk drives 14 and 16 are mounted flush with decorative panel B. Although drive face plates 14 and 16 are shown as a 3.5 inch drive and a 5 inch drive respectively, any appropriate drive size could easily be accommodated. Note that it is contemplated that three decorative panels could actually be implemented as a single sheet of material containing two equidistant bends (tri-fold arrangement). Two of these tri-folded panels could be nested together (one rotated 90° to nest in the second) to form the enclosure. Furthermore, the decorative panels could readily be attached to the interior of the enclosure. Finally, although the present invention is shown as a cubic computer housing, the fundamentals of the present invention are equally applicable to any shaped computer housing.

Figure 2:
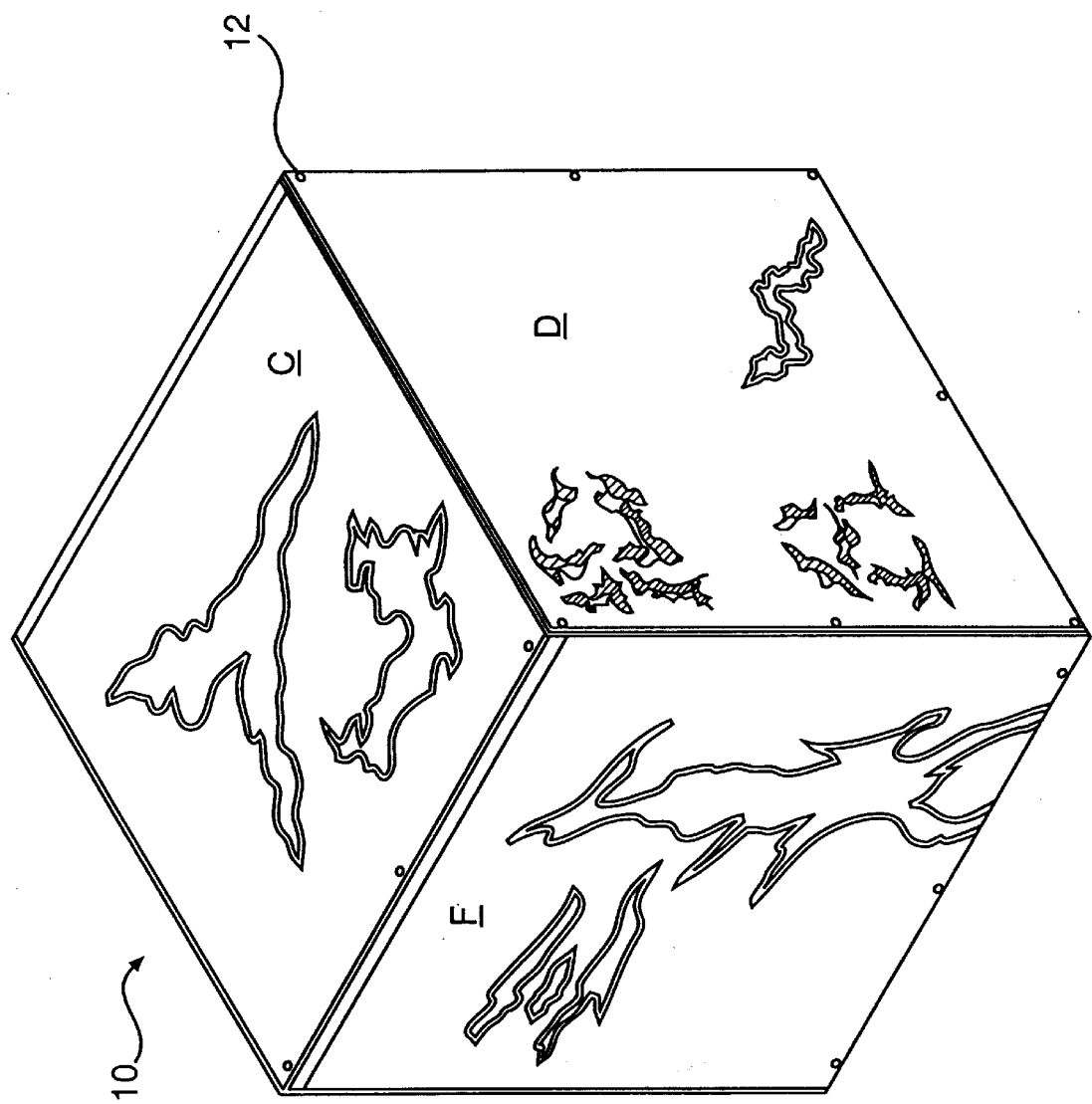
FIG. 2 is a perspective view of a computer housing according to a preferred embodiment of the present invention showing decorative panels F, C, and D.
Figure 4:
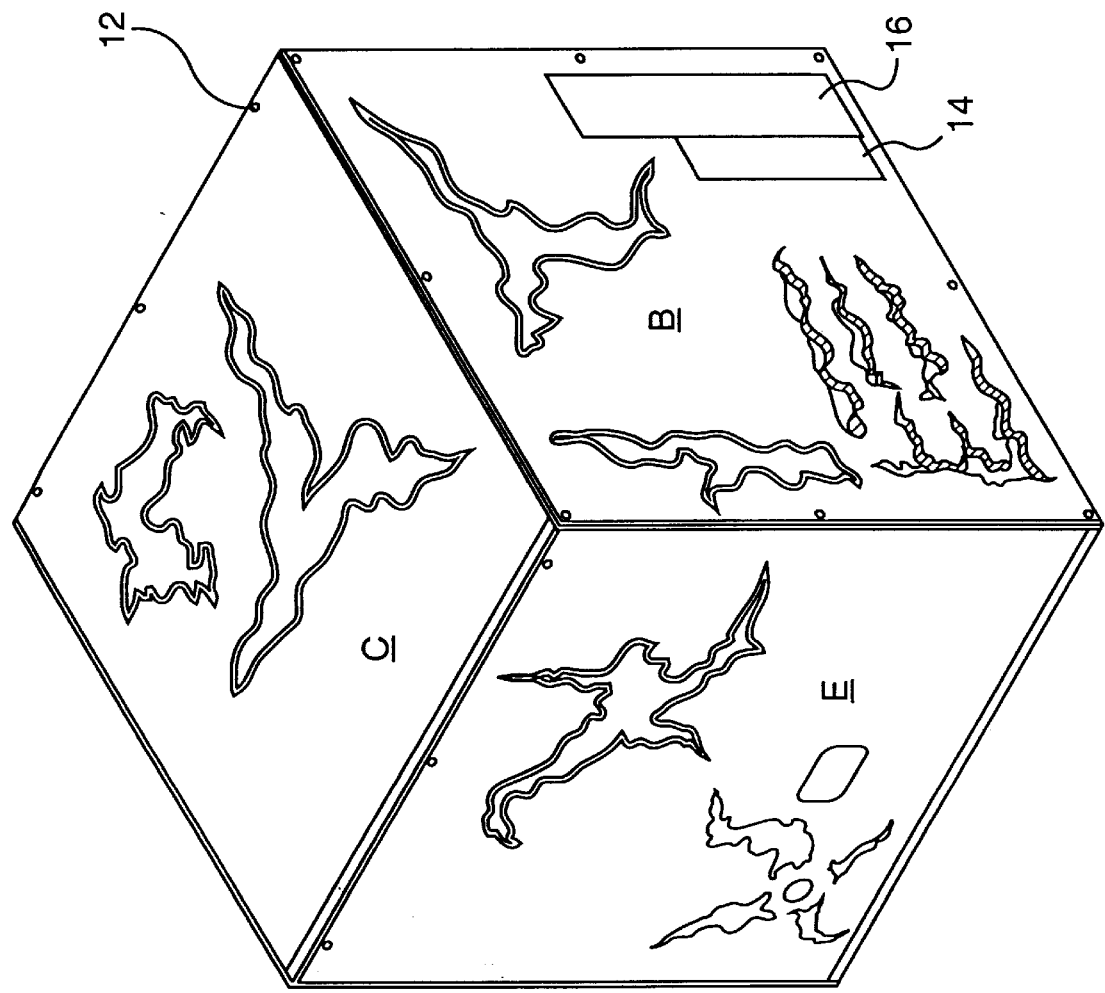
FIG. 4 is a perspective view of a computer housing according to a preferred embodiment of the present invention showing decorative panels E, C, and B.

FIG. 2 is a perspective view the computer housing according to a preferred embodiment of the present invention showing decorative panels F, C, and D, while FIG. 4 shows decorative panels E, C, and B.

Figure 3:
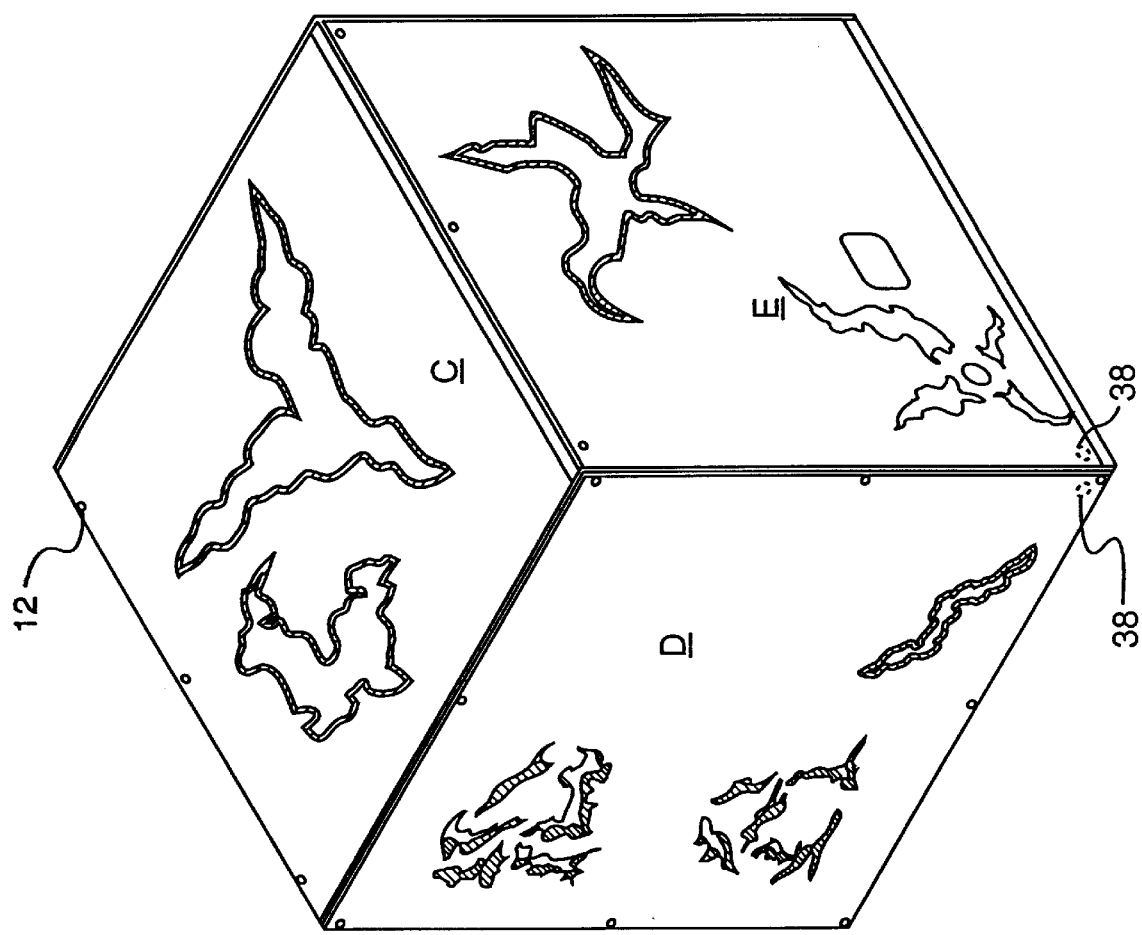
FIG. 3 is a perspective view of a computer housing according to a preferred embodiment of the present invention showing decorative panels D, C, and E.

FIG. 3 shows decorative panels D, C, and E. Also shown in FIG. 3 are mounting holes 38 (a third mounting hole is located on decorative panel A—not shown). These mounting holes allow the entire computer housing 10 to be mounted to a base or suspended from a wire above the conventional work surface. This arrangement provides the desired effect of reducing the amount of work space required for the computer. Although suspension holes 38 are only shown in decorative panels A, D, and E, they could be placed in any or all of the decorative panels to allow the computer housing 10 to be suspended in a variety of orientations. In a preferred embodiment, connections between the computer enclosure and peripherals such as a mouse, or keyboard are wireless (e.g. IR).

Figure 5:
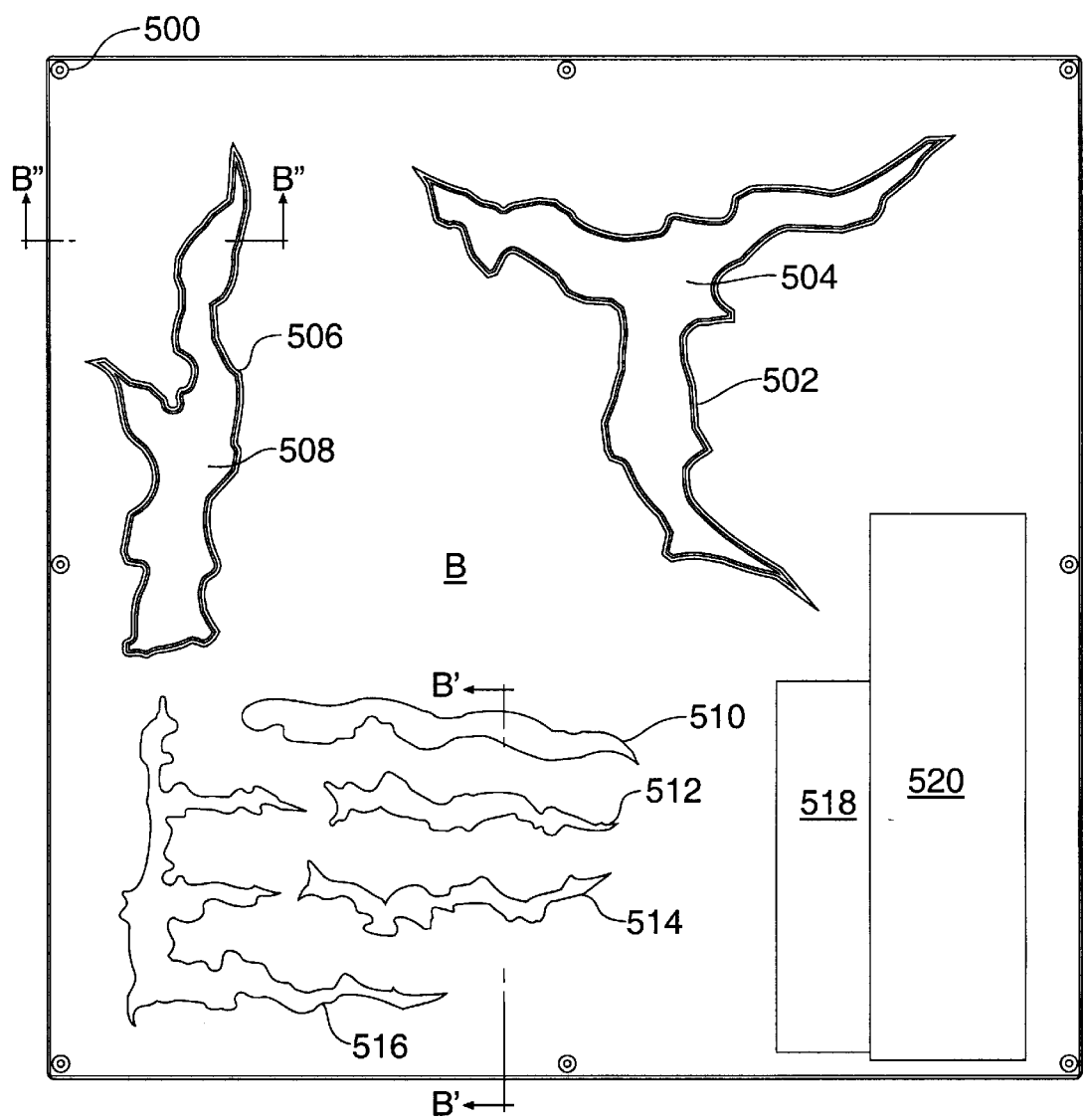
FIG. 5 is a front view of decorative panel B in accordance with the present invention.

The decorative panel for attachment to the exterior of a computer enclosure according to the present invention includes a fastener receiving portion for facilitating attachment of the decorative panel to an outer surface of the computer enclosure, a plurality of irregular geometric shaped surface depressions on a first surface of the decorative panel fixed in an ornamental arrangement, and at least one bore which extends completely through the decorative panel adapted to allow air to flow through the decorative panel and into an interior of the computer enclosure. For example, as shown in FIG. 5, decorative panel B includes fastener receiving holes 500, irregular geometric shaped surface depressions 504 and 506, through bores 510, 512, 514, and 516, and disk drive access openings 518 and 520. Decorative panel B is preferably manufactured such that irregular geometric shaped surface depressions 504 and 506 contain valleys 504 and 508 respectively. The phrase irregular geometric shaped is used to describe any shape which is not generally associated with regular geometric shapes (circles, triangles, parallelograms, etc.). Decorative panels A, B, C, D, E, and F may be constructed of any appropriate rigid and/or shock resistant material. For example, decorative panels A, B, C, D, E, and F may be constructed of metal, plastic, polymeric material, glass, rubber. Preferably, decorative panels A, B, C, D, E, and F may be constructed in an unlimited variety of colors from LEXAN™ (or another polycarbonate material), acrylic, or anodized aluminum. If a material such as black anodized aluminum is utilized, after manufacturing, the valleys in the irregular geometric shaped surface depressions may be of a different color than the surface of the decorative panel. Furthermore, if a rubber material is utilized, the interior components of the computer will be insulated/protected from exterior vibration/physical shock of the computer housing.

Figure 6:
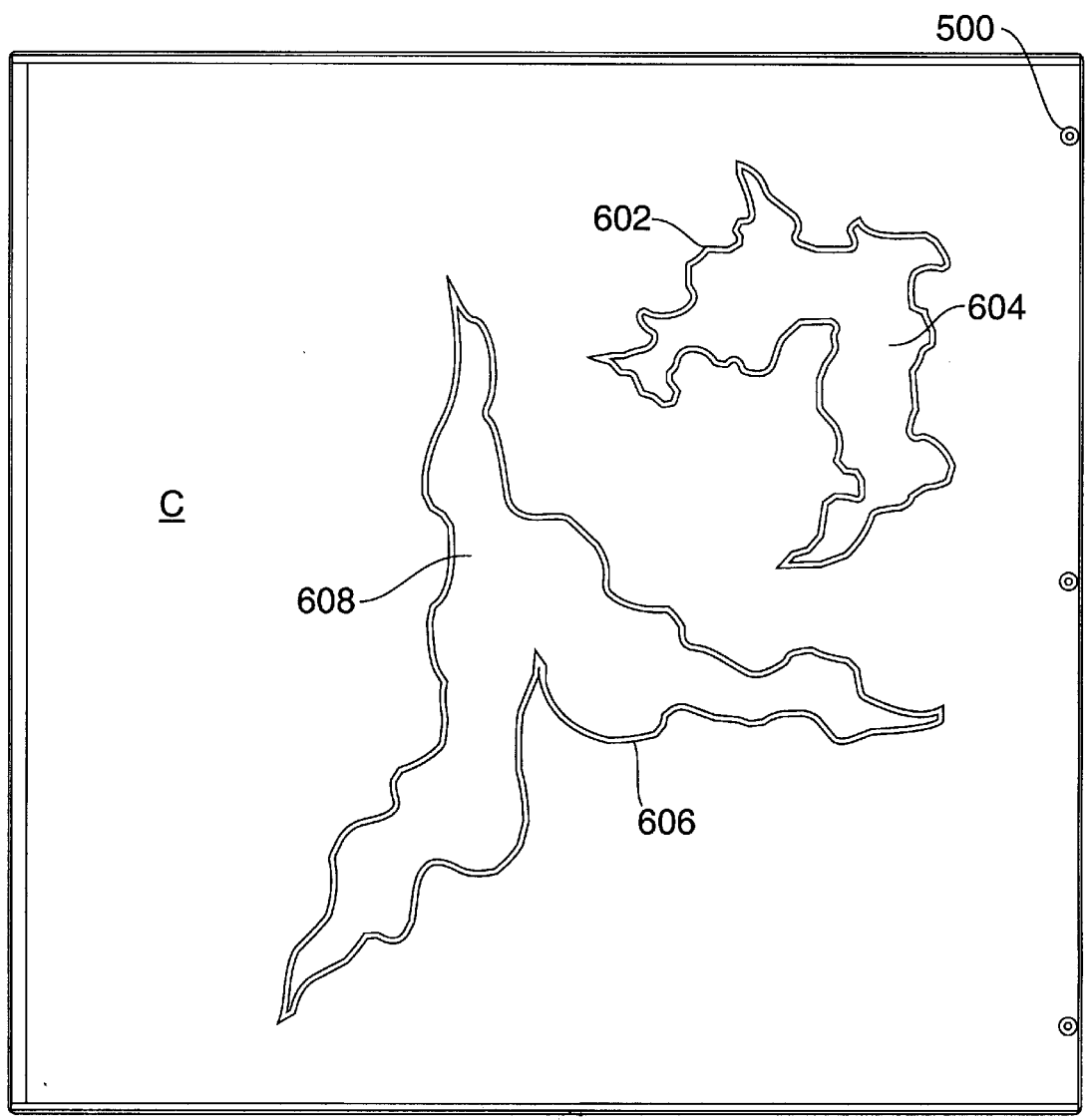
FIG. 6 is a front view of decorative panel C in accordance with the present invention.

FIG. 6 shows a front view of decorative panel C in accordance with the present invention. As shown in FIG. 6, decorative panel C includes irregular geometric shaped surface depressions 602 and 606. Irregular geometric shaped surface depressions 602 and 606 contain valleys 604 and 608 respectively. Although the example of decorative panel C, as shown, does not include any through bores and/or disk drive access openings, these features could be incorporated in this panel without departing from the scope or spirit of the invention.

Figure 7:
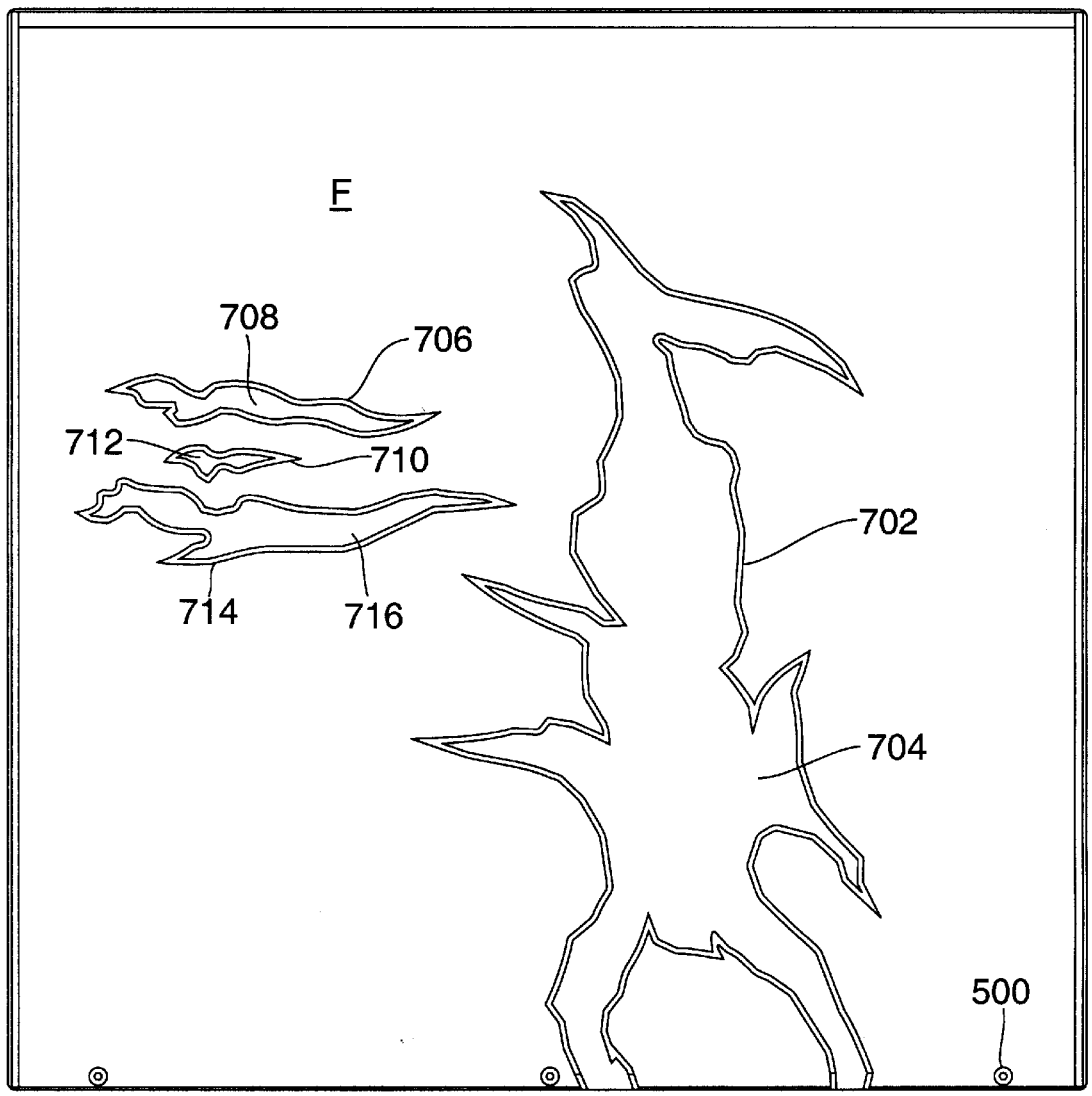
FIG. 7 is a front view of decorative panel F in accordance with the present invention.

FIG. 7 shows a front view of decorative panel F in accordance with the present invention. As shown, decorative panel F includes irregular geometric shaped surface depressions 702, 706, 710, and 714. Irregular geometric shaped surface depressions 702, 706, 710, and 714 contain valleys 704, 708, 712, and 716 respectively. As was the case with decorative panel C, although the example of decorative panel F, as shown, does not include any through bores and/or disk drive access openings, these features could be incorporated in this panel without departing from the scope or spirit of the invention.

Figure 8:
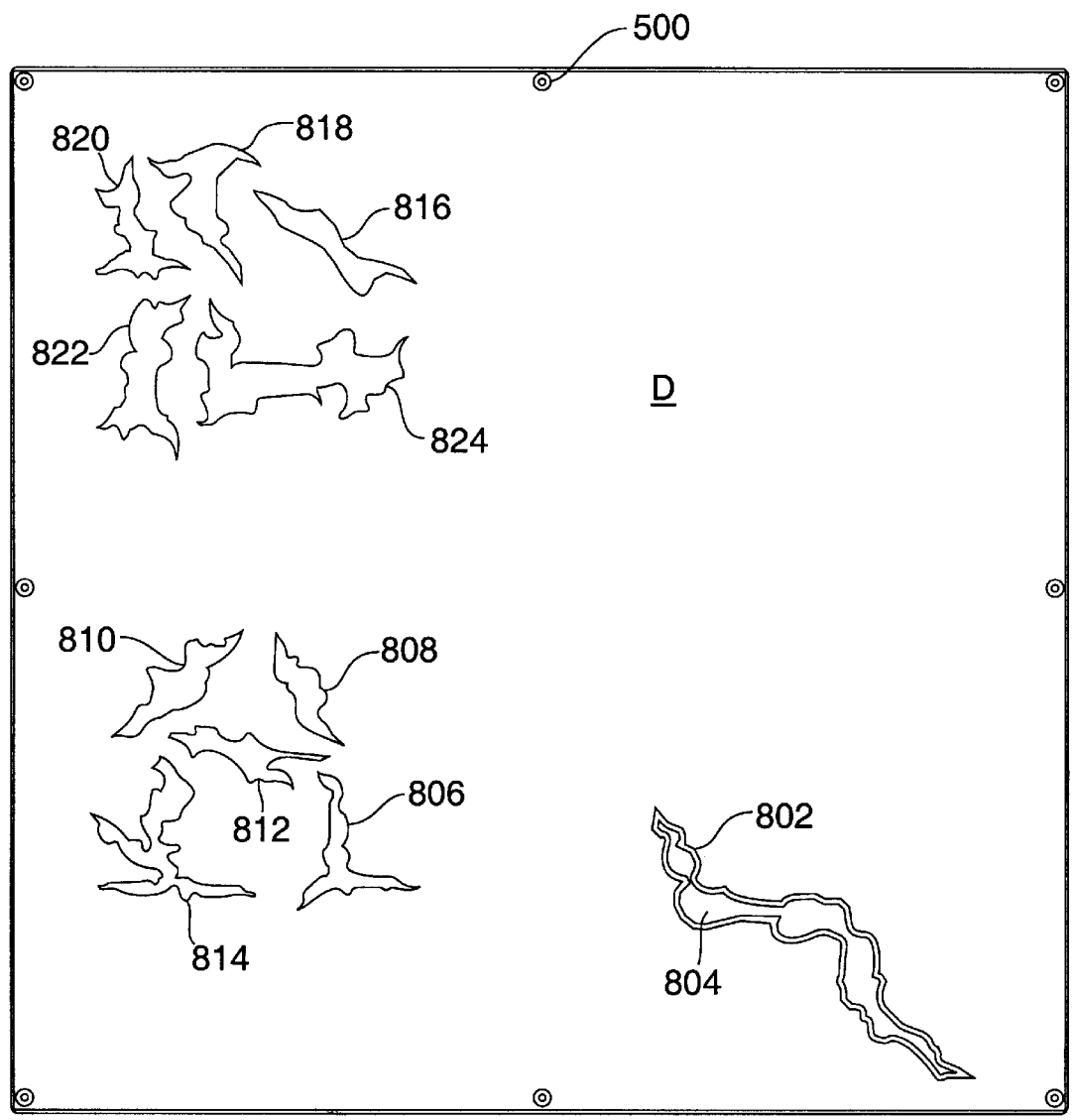
FIG. 8 is a front view of decorative panel D in accordance with the present invention.

As shown in FIG. 8, decorative panel D includes fastener receiving holes 500, irregular geometric shaped surface depression 802 and through bores 806, 808, 810, 812, 814, 816, 818, 820, 822, and 824. Decorative panel D has been manufactured such that irregular geometric shaped surface depression 802 contains valley 804.

Figure 9:
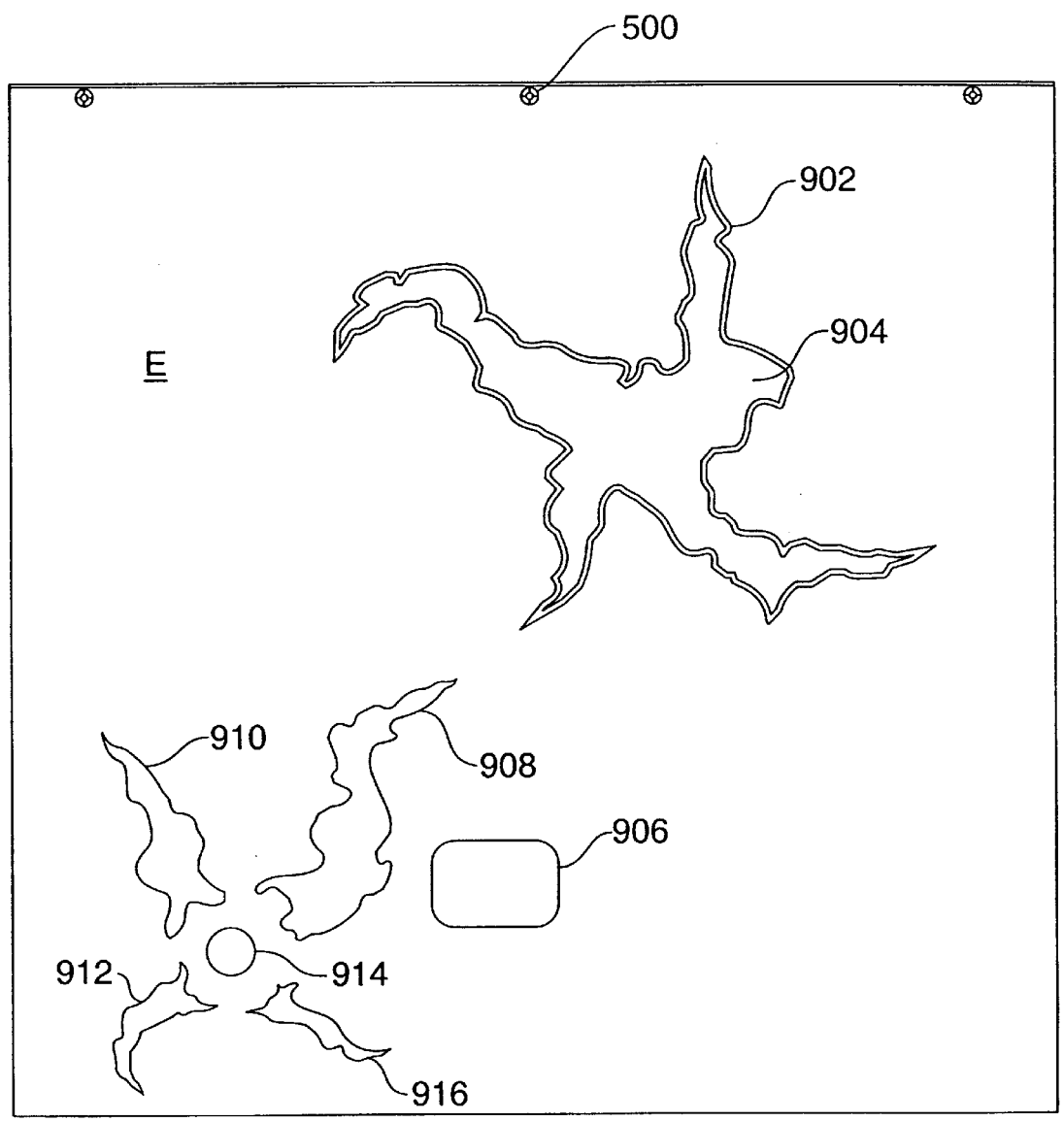
FIG. 9 is a front view of decorative panel E in accordance with the present invention.

FIG. 9 shows decorative panel E which includes fastener receiving holes 500, irregular geometric shaped surface depression 902 and through bores 906, 908, 910, 912, 914, and 916. Decorative panel E has been manufactured such that irregular geometric shaped surface depression 902 contains valley 904. Through bore 906 is adapted to receive a connector, while through bore 914 is adapted to receive a power cord/cable. Although a single through bore is shown for receiving a connector, further through bores may be added for additional connectors if desired.

Figure 10:
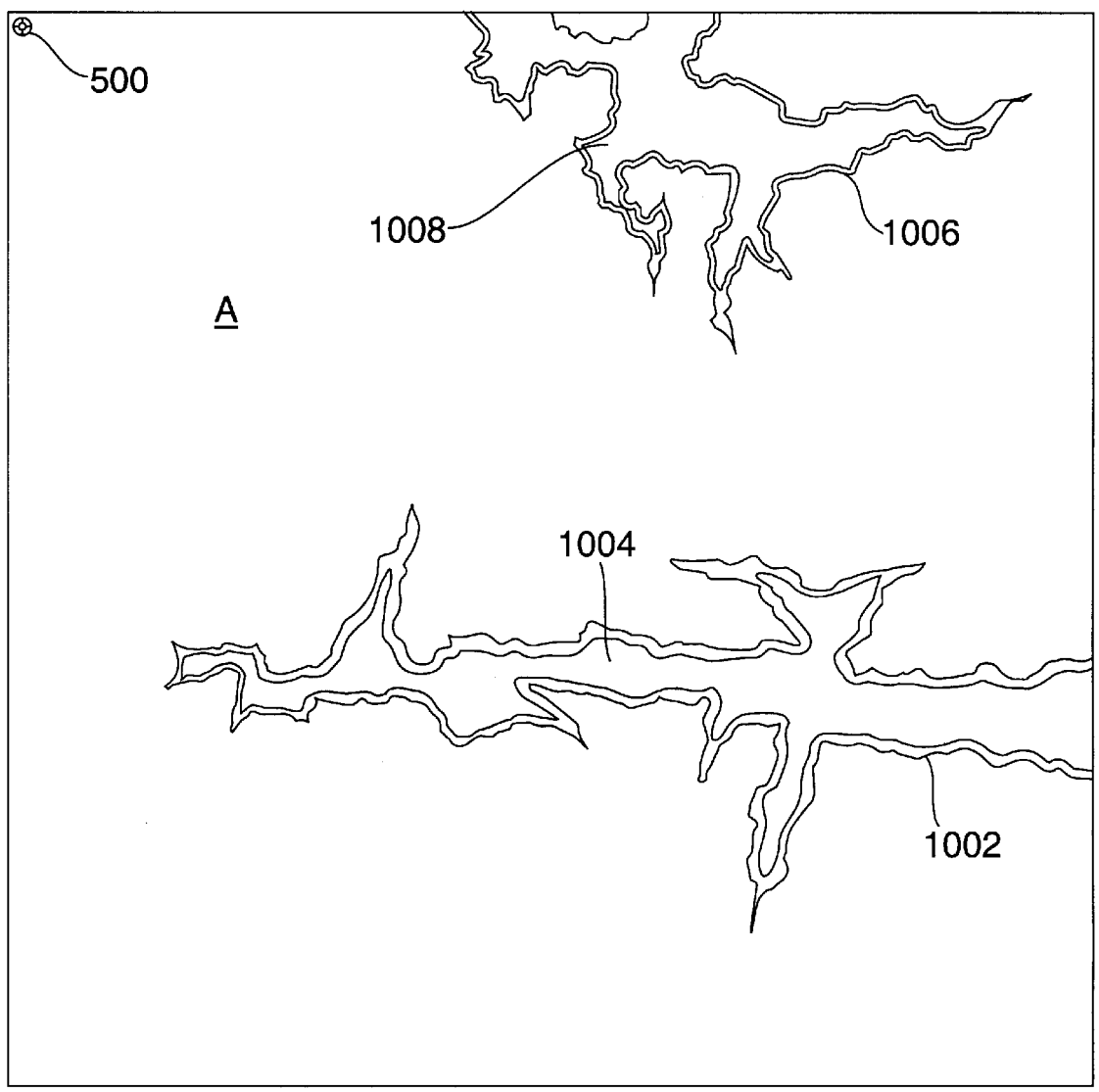
FIG. 10 is a front view of decorative panel A in accordance with the present invention.

FIG. 10 shows a front view of decorative panel A in accordance with the present invention. As shown in FIG. 10, decorative panel A includes irregular geometric shaped surface depressions 1002 and 1006. Irregular geometric shaped surface depressions 1002 and 1006 contain valleys 1004 and 1008 respectively. Although the example of decorative panel A, as shown, does not include any through bores and/or disk drive access openings, these features could be incorporated in this panel without departing from the scope or spirit of the invention.

Figure 11:
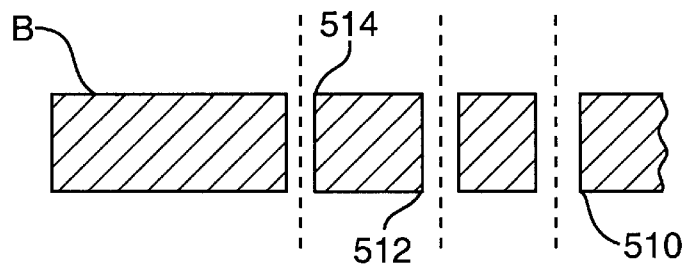
FIG. 11 is a cross-sectional view taken along line B'—B' of FIG. 5 in accordance with the present invention.

FIG. 11 shows a cross-sectional view taken along line B'—B' of FIG. 5. As shown in this figure, bores 510, 512, and 514 extend completely through decorative panel B to allow air to flow into the interior of the computer enclosure.

Figure 12:
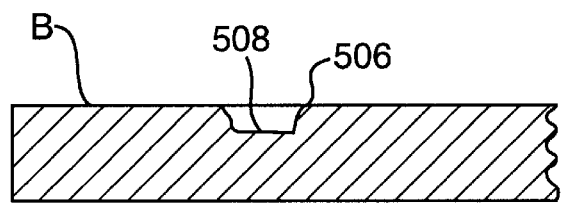
FIG. 12 is a cross-sectional view taken along line B"—B" of FIG. 5 in accordance with the present invention.

FIG. 12 shows a cross-sectional view taken along line B"—B" of FIG. 5. This figure shows the relationship of valley 508 to irregular geometric shaped surface depression 506 in decorative panel B.

Figure 13:
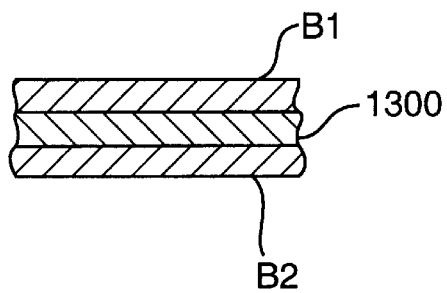
FIG. 13 is an enlarged cut-away view of decorative panel B in accordance with an alternate embodiment of the present invention.

FIG. 13 shows an enlarged cut-away view of decorative panel B in accordance with an alternate embodiment of the present invention. In this embodiment, EMI/RFI shielding material 1300 is sandwiched between two layers (B1 and B2) of decorative panel B. EMI/RFI shielding material 1300 may be constructed of any appropriate material. Preferably, EMI/RFI shielding material 1300 may be formed from a wire mesh.

Figure 14:
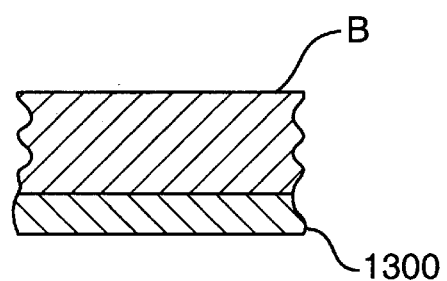
FIG. 14 is an enlarged cut-away view of decorative panel B in accordance with another alternate embodiment of the present invention.

FIG. 14 shows an enlarged cut-away view of decorative panel B in accordance with an another alternate embodiment of the present invention. In this embodiment, EMI/RFI shielding material 1300 is sandwiched between decorative panel B and the computer enclosure.

Figure 15:
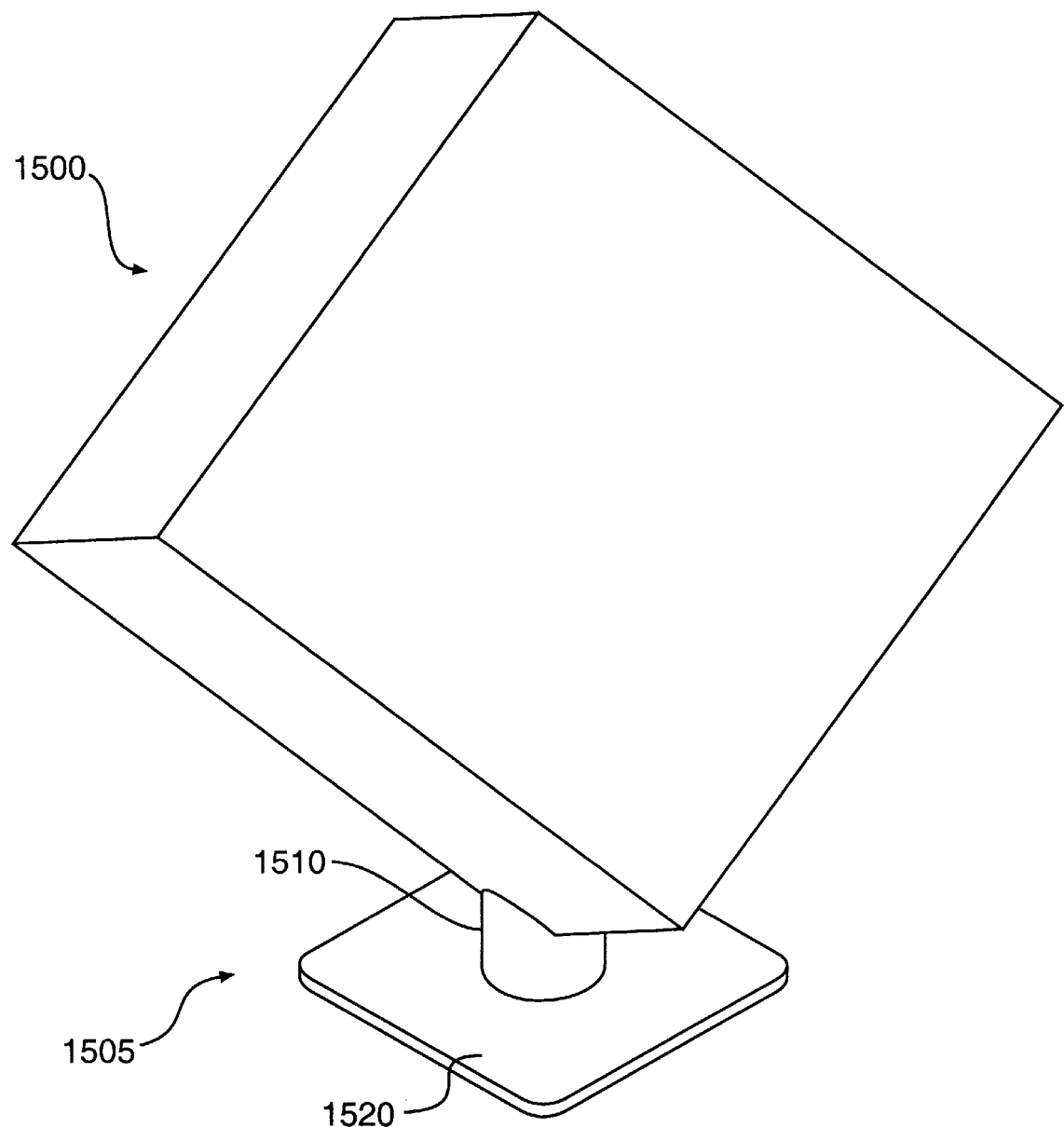
FIG. 15 is an isometric view of a computer housing according to an embodiment of the present invention (showing plain side panels) mounted on an embodiment of a base.

FIG. 15 is an isometric view of a computer housing according to an embodiment of the present invention (showing plain side panels) mounted on an embodiment of a base. As is shown in FIG. 15, computer housing 1500 is mounted on base 1505 such that a tip of the housing extends into the base. Base 1505 includes support collar 1510 and base plate 1520. Compared with prior art configurations, this mounting arrangement provides available workspace around the computer.

Figure 16:
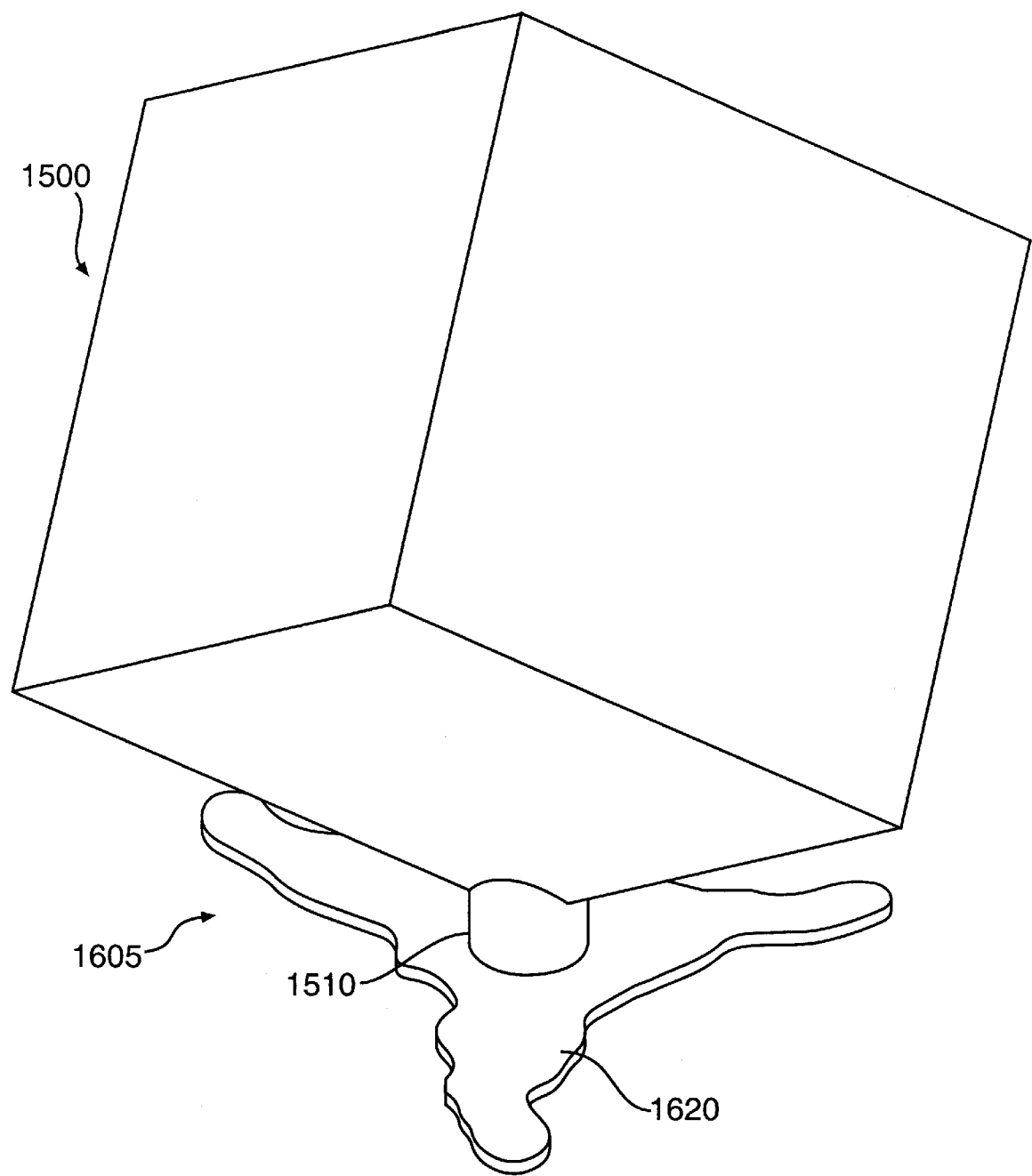
FIG. 16 is an isometric view of a computer housing according to an embodiment of the present invention (showing plain side panels) mounted on a preferred embodiment of a base.
Figure 17:
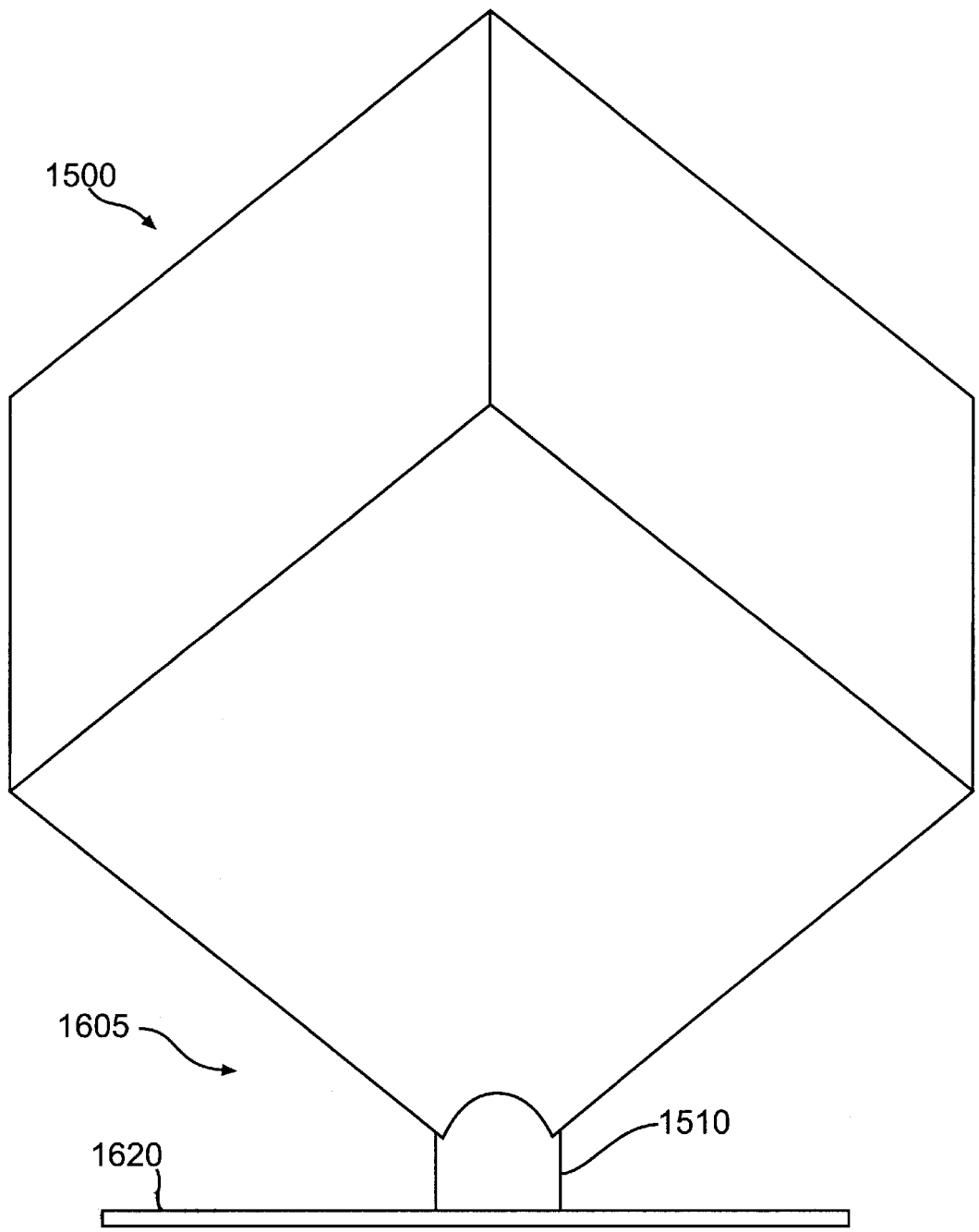
FIG. 17 is a front view of a computer housing of FIG. 16.

FIG. 16 is an isometric view of a computer housing according to an embodiment of the present invention (showing plain side panels) mounted on a preferred embodiment of a base. As shown in this figure, computer housing 1500 is mounted on modified base 1605 such that a tip of the housing extends into the base. Base 1605 includes support collar 1510 and aesthetically pleasing base plate 1620. FIG. 17 depicts a front view of a computer housing of FIG. 16.

Figure 18:
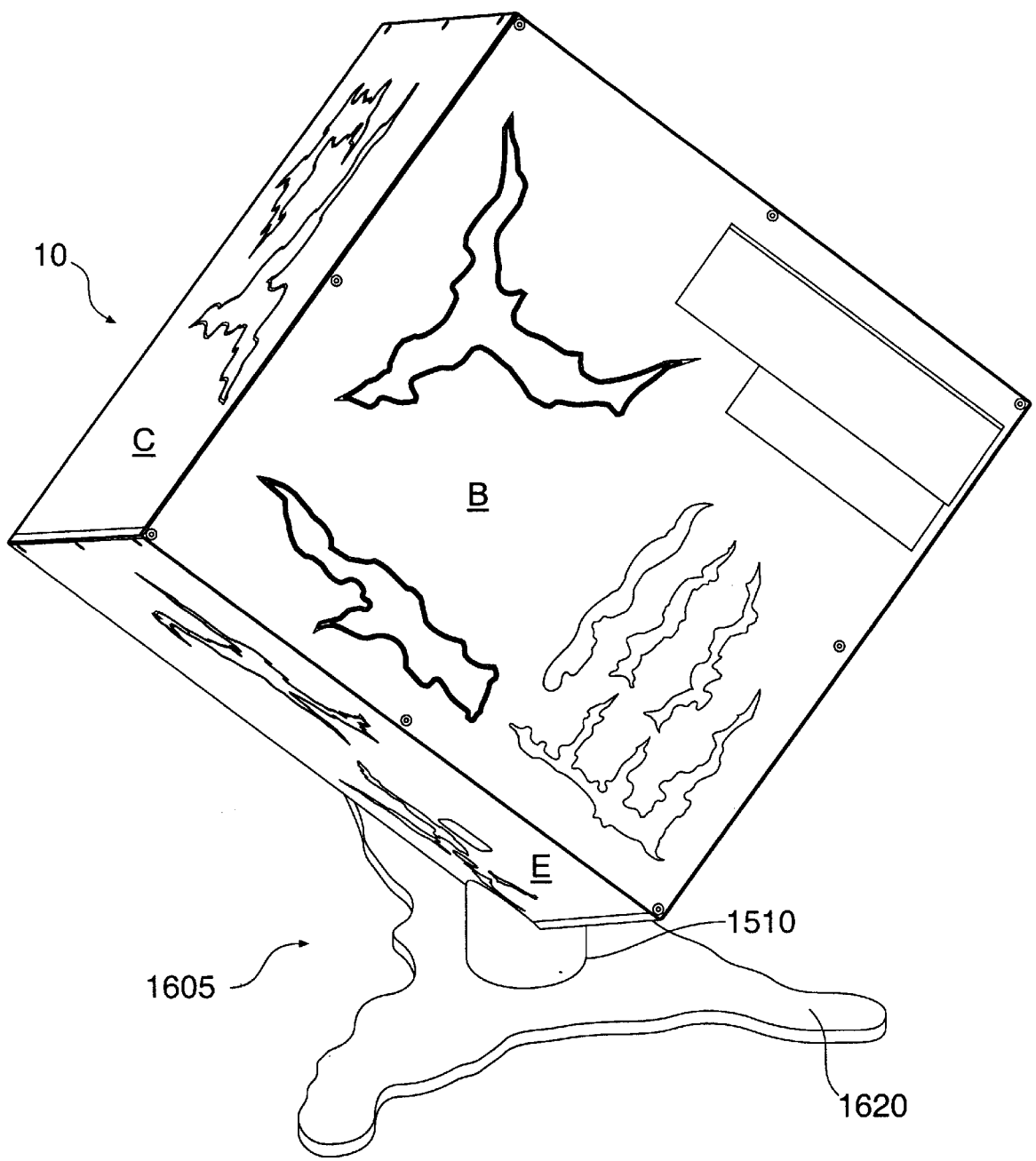
FIG. 18 is an isometric view of a computer housing according to a preferred embodiment of the present invention mounted on a preferred embodiment of a base.

FIG. 18 is an isometric view of a computer housing according to a preferred embodiment of the present invention mounted on a preferred embodiment of a base. FIG. 18 shows computer housing 10 (decorative panels B, C, and E shown) mounted to base 1605.

Figure 19:
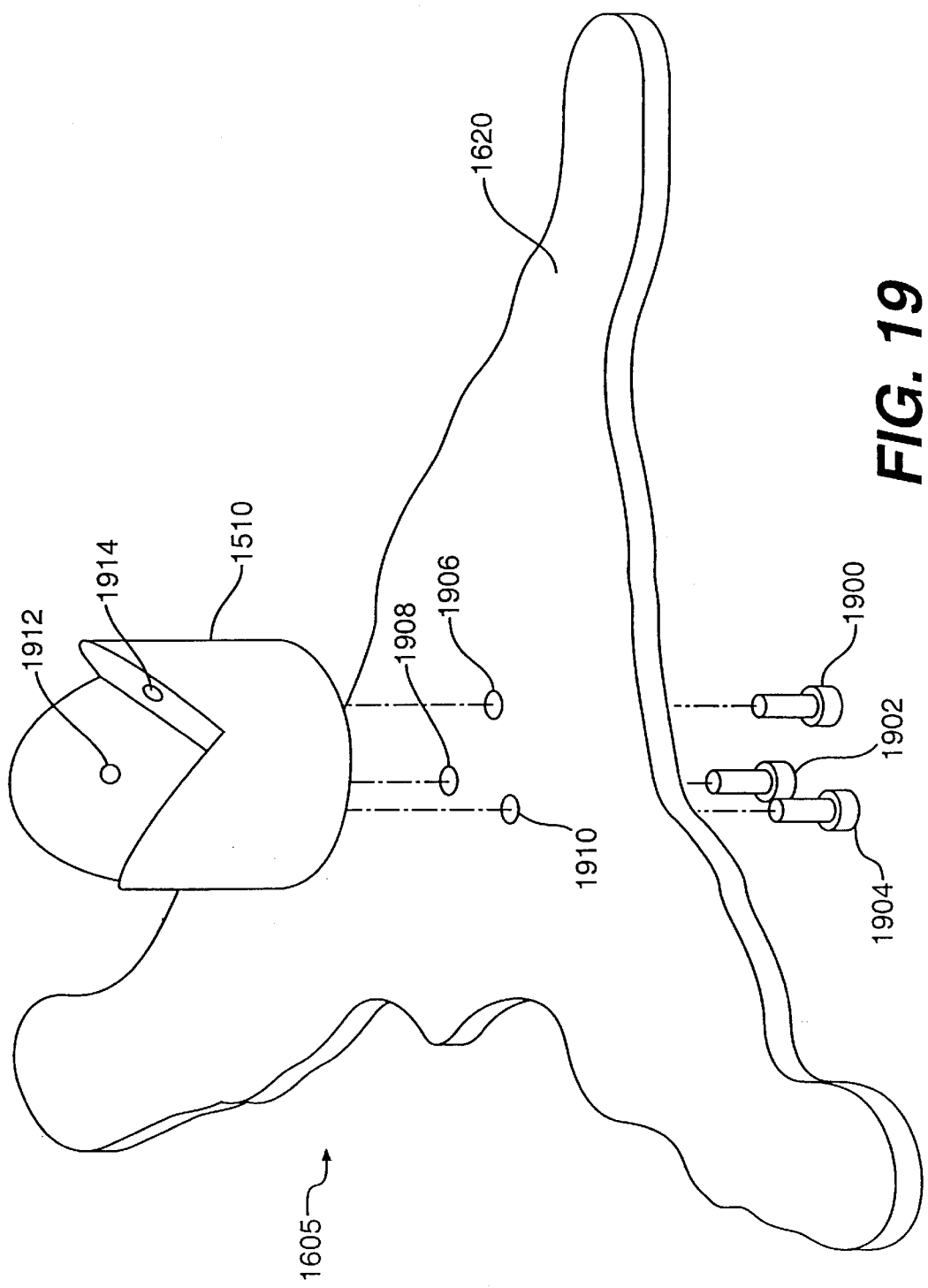
FIG. 19 is an isometric view of the attachment of a preferred embodiment of a base to a preferred embodiment of a support collar according to the present invention.

FIG. 19 is an isometric view of the attachment of a preferred embodiment of a base to a preferred embodiment of a support collar according to the present invention. Base 1605 includes support collar 1510 and aesthetically pleasing base plate 1620. Support collar 1510 is attached to base plate 1620 by fasteners 1900, 1902, and 1904. Fasteners 1900, 1902, and 1904 pass through holes 1906, 1908, and 1910 (in base plate 1620), and then pass through holes 1912, 1914, and 1916 (not shown) in support collar 1510. Fasteners 1900, 1902, and 1904 are then received in holes 38 (see FIG. 3). Thus, computer housing 10 (1500) is securely attached to base 1605. Fasteners 1900, 1902, and 1904 may comprise any appropriate fastening means. For example, fasteners 1900, 1902, and 1904 may comprise bolts, screws, or rivets. Preferably, fasteners 1900, 1902, and 1904 comprise screws.

Figure 20:
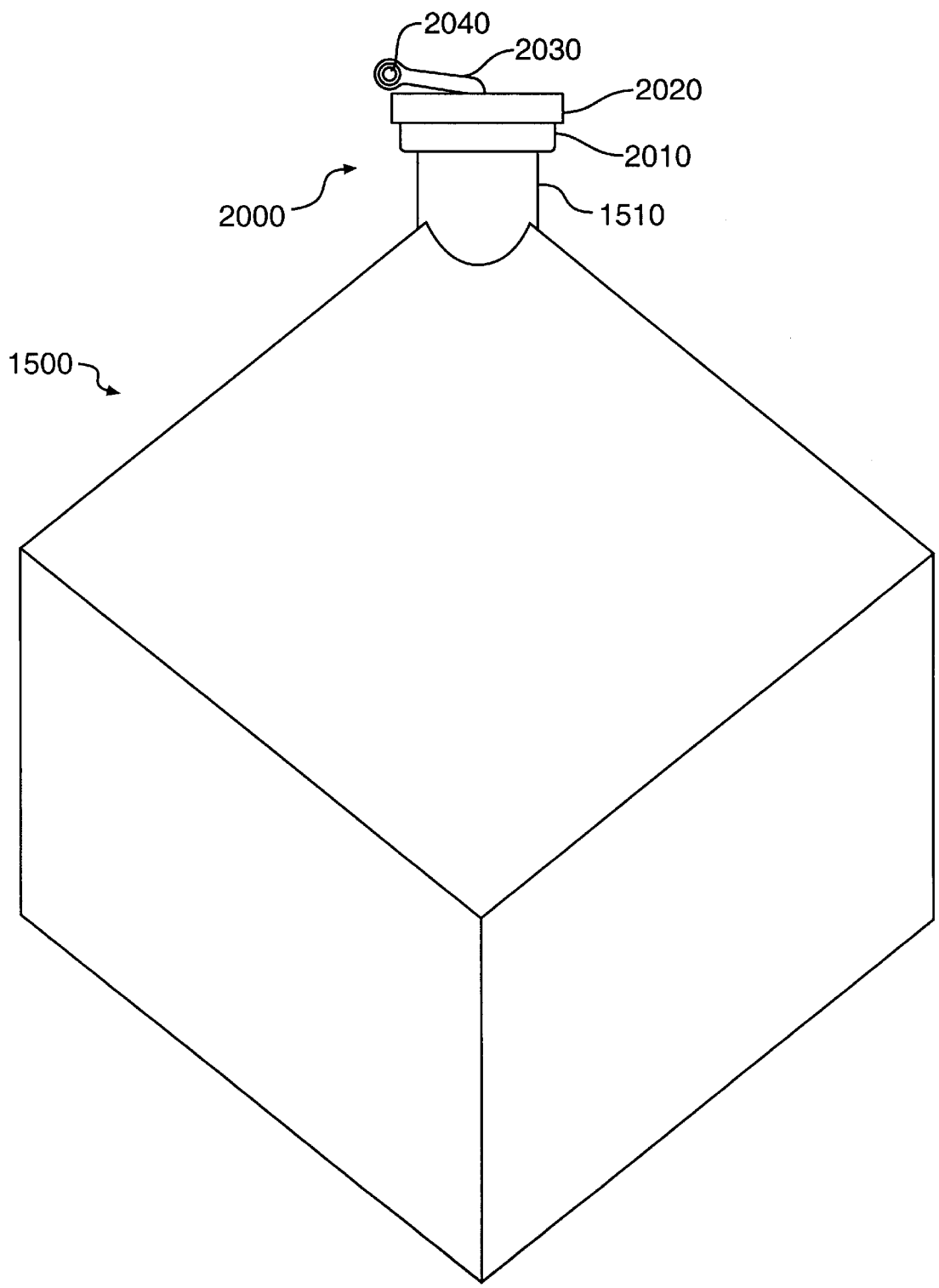
FIG. 20 is a front view of a computer housing according to an embodiment of the present invention (showing plain side panels) mounted to a preferred embodiment of a suspension mount.

FIG. 20 is a front view of a computer housing according to an embodiment of the present invention (showing plain side panels) mounted to a preferred embodiment of a suspension mount. As shown in this figure, computer housing 1500 has been inverted from its position in FIG. 15. Suspension mount 2000 includes mounting ring 2010, lock ring 2020, suspension bar 2030, and suspension bar through hole 2040. Mounting ring 2010, lock ring 2020, and suspension bar 2030 may be constructed of any appropriate rigid material. For example, mounting ring 2010, lock ring 2020, and suspension bar 2030 may be constructed of metal or a high-strength plastic.

Figure 21:
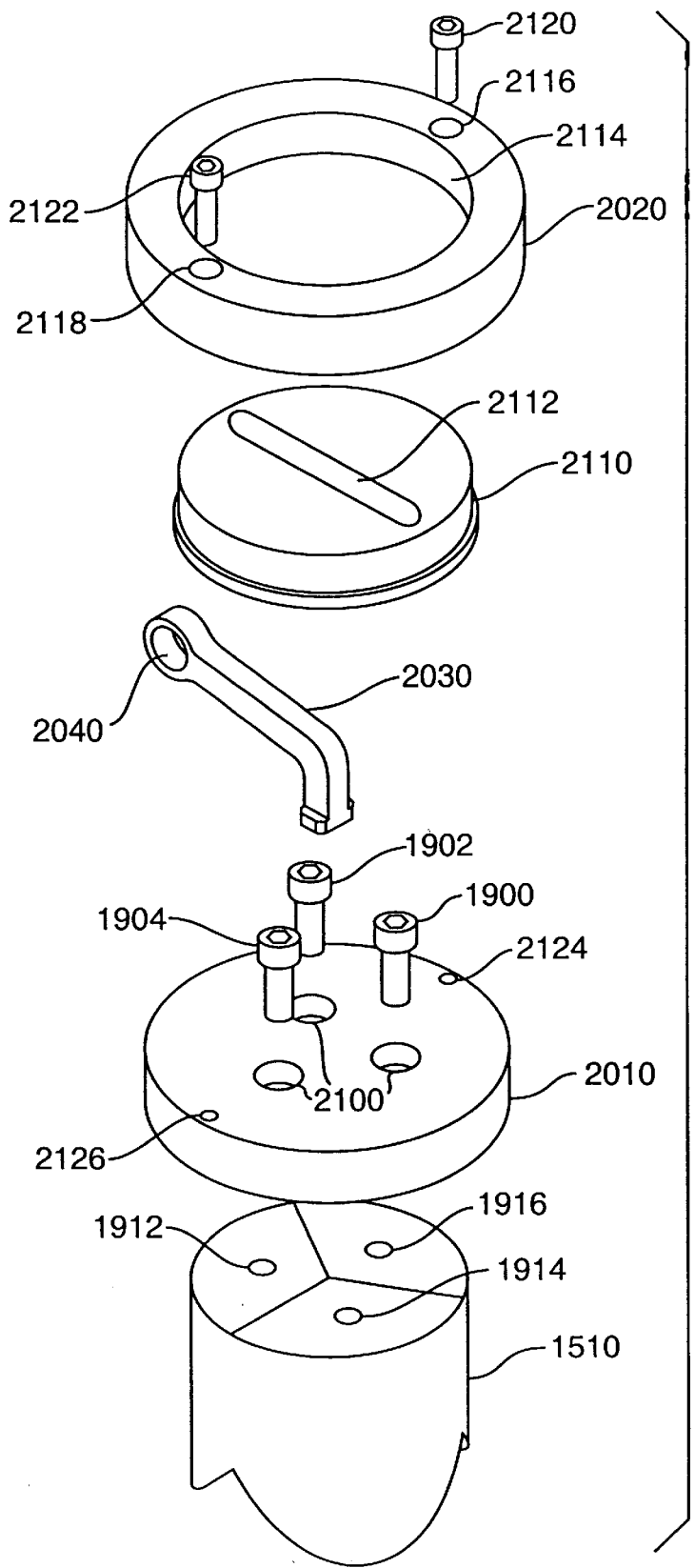
FIG. 21 is an exploded isometric view of a preferred embodiment of a suspension mount according to an embodiment of the present invention.

FIG. 21 is an exploded isometric view of a preferred embodiment of a suspension mount according to an embodiment of the present invention. As shown, mounting ring 2010 attaches to support collar 1510 by way of fasteners 1900, 1902, and 1904 which pass through holes 2100. The end of suspension bar 2030 nearest through hole 2040 is passed through slot 2112 in retainer 2110. Finally, retainer 2110 is sandwiched between lock ring 2020 and mounting ring 2010. This is accomplished via use of fasteners 2120 and 2122, through holes 2116 and 2118, and threaded receiving holes 2124 and 2126. Fasteners 2120 and 2122 may comprise any appropriate fastening means. For example, fasteners 2120 and 2122 may comprise bolts, screws, or rivets. Preferably, fasteners 2120 and 2122 comprise screws.

Figure 22:
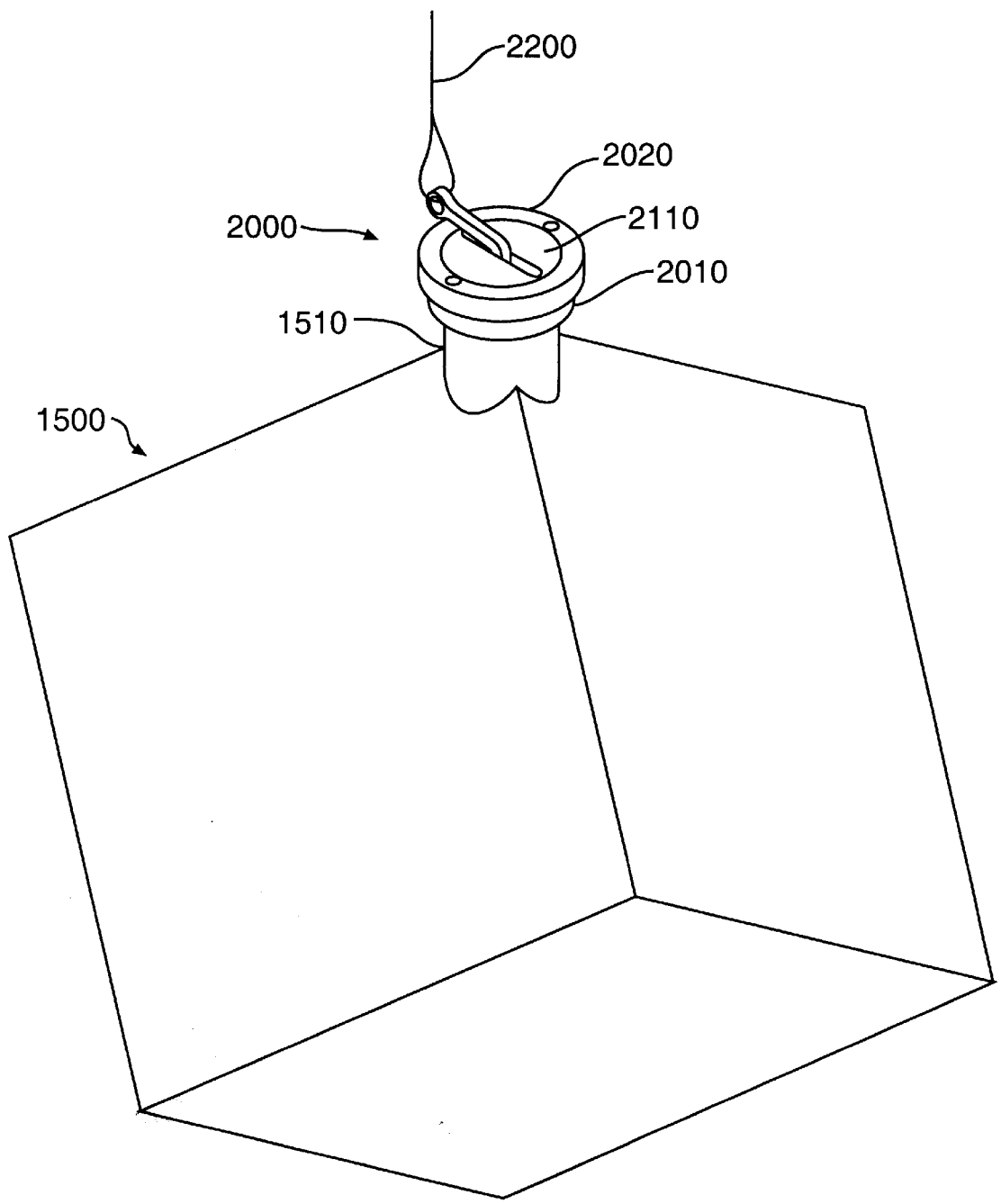
FIG. 22 is an isometric view of a computer housing according to an embodiment of the present invention (showing plain side panels) mounted to a preferred embodiment of a suspension mount in a suspended position.

FIG. 22 is an isometric view of a computer housing according to an embodiment of the present invention (showing plain side panels) mounted to a preferred embodiment of a suspension mount in a suspended position. As shown in FIG. 22, computer housing 1500 is suspended from suspension cable 2200 (may be wire or fiber cable) via suspension mount 2000. Compared with prior art configurations, this mounting arrangement allows a user to maximize the available workspace around the computer.

It will be apparent to those skilled in the art that various modifications and variations can be made in the decorative panel and computer housing of the present invention without departing from the spirit or scope of the invention. Thus, it is intended that the present invention cover the modifications and variations of this invention provided they come within the scope of the appended claims and their equivalents.

What is claimed is:

1. A decorative panel system of a cubic computer enclosure comprising:
   six decorative panels attached to an outer surface of the computer enclosure, each of said decorative panels comprising:
      a fastener receiving portion for facilitating attachment of each decorative panel to the outer surface of the computer enclosure;
      a plurality of irregular geometric shaped surface depressions on a first surface of each decorative panel fixed in an ornamental arrangement; and
      at least one bore on at least one of said decorative panels which extends completely through said at least one of said decorative panels and is adapted to allow air to flow through said at least one of said decorative panels and into an interior of the computer enclosure.

2. The decorative panel system of claim 1, wherein said at least one bore has an irregular geometric shape.

3. The decorative panel system of claim 1, wherein said first surface of each panel is formed from metal.

4. The decorative panel system of claim 3, wherein said first surface of each panel is formed from aluminum.

5. The decorative panel system of claim 1, wherein said first surface of each panel is formed from at least one of a plastic and a polymer.

6. The decorative panel system of claim 1, wherein said first surface of each panel is formed from rubber.

7. The decorative panel system of claim 1, further comprising a second surface formed opposite said first surface of each panel, wherein an interference shielding material is disposed between said first surface and said second surface of at least one of said panels.

8. The decorative panel system of claim 7, wherein said interference shielding material comprises a wire mesh.

9. A computer housing comprising:
   an enclosure adapted to receive internal components of a computer;
   at least two rectangular decorative panels attached to outer surfaces of said enclosure, each of said decorative panels comprising:
      a fastener receiving portion for facilitating attachment of the decorative panel to at least one of the outer surfaces of said computer enclosure;
      a plurality of irregular geometric shaped surface depressions on first surface of the decorative panel fixed in an ornamental arrangement; and
   at least one bore on at least one of said decorative panels which extends completely through said at least one of said decorative panels and is adapted to allow air to flow through said at least one of said decorative panels and into an interior of said enclosure.

10. The computer housing of claim 9, wherein said at least one bore has an irregular geometric shape.

11. The computer housing of claim 9, wherein said first surface of each panel is formed from metal.

12. The computer housing of claim 11, wherein said first surface of each panel is formed from aluminum.

13. The computer housing of claim 9, wherein said first surface of each panel is formed from at least one of a plastic and a polymer.

14. The computer housing of claim 9, wherein said first surface of each panel is formed from rubber.

15. The computer housing of claim 9, wherein at least one of said decorative panels further comprises a second surface formed opposite said first surface, wherein an interference shielding material is disposed between said first surface and said second surface.

16. The computer housing of claim 15, wherein said interference shielding material comprises a wire mesh.

17. The computer housing of claim 9, wherein said at least two rectangular panels comprise at least three rectangular panels.

18. The computer housing of claim 9, wherein said at least two rectangular panels comprise at least four rectangular panels.

19. The computer housing of claim 9, wherein said at least two rectangular panels comprise at least five rectangular panels.

20. The computer housing of claim 9, wherein said at least two rectangular panels comprise six rectangular panels.

21. The computer housing of claim 20, wherein each of said rectangular panels is a square panel.

* * * * *